United States Patent [19]

Southard

[11] 4,134,382
[45] Jan. 16, 1979

[54] ROTARY INTERNAL COMBUSTION ENGINE

[76] Inventor: Albert A. Southard, R.R. #3, Council Grove, Kans. 66846

[21] Appl. No.: 745,555

[22] Filed: Nov. 29, 1976

Related U.S. Application Data

[63] Continuation-in-part of Ser. No. 522,500, Nov. 11, 1974, Pat. No. 3,994,641, which is a continuation-in-part of Ser. No. 322,430, Jan. 10, 1973, abandoned.

[51] Int. Cl.² .............................................. F02B 55/16
[52] U.S. Cl. ..................................................... 123/243
[58] Field of Search ................................. 123/8.45, 243

[56] References Cited

U.S. PATENT DOCUMENTS

| | | | |
|---|---|---|---|
| 1,575,860 | 3/1926 | Monk | 123/8.45 |
| 2,274,232 | 2/1942 | Boyer | 123/8.45 |
| 2,295,117 | 9/1942 | Koester | 123/8.45 |
| 3,955,540 | 5/1976 | Blanchard | 123/8.45 |

Primary Examiner—Carlton R. Croyle
Assistant Examiner—Leonard E. Smith
Attorney, Agent, or Firm—Robert E. Breidenthal

[57] ABSTRACT

A four-chamber rotary internal combustion engine wherein each chamber is operated on a four-stroke cycle with adjacent chambers being operated 90° out of phase with each other so that combustion or power strokes are effected adjacent diametrically opposed parts of the housing. Intake and exhaust valving functions are effected by rotary valves constituted of passageways in the housing and rotor, and with adjacent chambers having intake and exhaust connection to separate sets of passageways in the housing.

16 Claims, 10 Drawing Figures

ROTARY INTERNAL COMBUSTION ENGINE

The present invention relates to new and useful improvements in rotary internal combustion engines and is a continuation-in-part of my copending application, Ser. No. 522,500, now U.S. Pat. No. 3,994,641 entitled Rotary Positive Fluid Displacement Machine and filed Nov. 11, 1974, such copending application being a continuation-in-part of now abandoned application Ser. No. 322,430, entitled Rotary Internal Combustion Engine Having Cam Actuated Vanes, and filed Jan. 10, 1973.

The primary object of the present invention is to obtain a more uniform angular distribution of heat production in a rotary engine so as to minimize temperatures and thermally caused mechanical stresses and displacements, and to facilitate cooling of the engine.

Another important object is to provide a phase adjustable intake and exhaust valving of the chambers.

Still another important object is to provide an engine of the character specified above wherein the power stroke cycles of each chamber can be staggered to reduce the power strokes per engine revolution.

Yet another important object is to provide a chamber separating vane means in an association with a chamber separated thereby such as to increase the sealing efficiency of the vane means, to increase the power stroke expansion of the chamber, and to enhance the torque applied to the rotor during such expansion.

Broadly, the invention involves, in a method of operating a rotary engine of the type wherein an even number of operating zones are caused to orbit an axis and sequentially pass through an even number of fixed sectors with each zone alternatively increasing and decreasing in volume as it passes through successive sectors, and wherein a four-stroke operating cycle is effected relative to each of the zones, the improvement comprising operating zones that are spaced apart by a single intervening zone out of phase with each other 180 plus 360 times N degrees, and operating adjacent zones out of phase with each other 90 plus 180 times N degrees, with N having a value selected from zero and the positive integers.

Broadly also, the invention involves, in a rotary internal combustion engine of the type wherein a rotor is mounted for rotation in a housing having an elliptical inner wall surface with the rotor having four circumferentially spaced vane means rotatable therewith that slidingly and sealingly engage the wall surface to define four chambers about the rotor that vary in volume during rotation of the rotor, the improvement comprising the housing having a pair of air inlet ports opening to a surface of revolution of the rotor, said housing having a pair of exhaust ports opening to the surface of revolution of the rotor, valve means for admitting air into and exhausting combustion products from each of said chambers during rotor rotation, said four chambers being arranged as two pairs of diametrically opposed chambers, said valve means comprising said rotor having passageway means in association with one pair of the chambers that opens to the surface of revolution and which is in fluid communication registry with one of the inlet ports and one of the exhaust ports during predetermined portions of angular movement of the rotor, said valve means additionally comprising said rotor having passageway means in association with the other pair of chambers that opens to the surface of revolution and which is in fluid communication registry with the other inlet port and the other exhaust port during predetermined portions of angular movement of the rotor, the arrangement being such that the members of each of the diametrically opposed pairs of chambers have inlet and exhaust fluid communication at angular positions each of which is 180° from the other, and such that the chambers which are adjacent to each other have inlet fluid communication at angular positions spaced 90° from each other.

The foregoing objects as well as others are realized in the practice of the invention as will be best appreciated in the light of the following description of a preferred embodiment thereof, such description being given in conjunction with the accompanying drawings illustrative thereof, wherein:

Referring now to the drawings, wherein like numerals designate like parts throughout the various views, the reference numeral 10 designates the motor generally, the same having as major parts and assemblies a rotor 12 provided with radially extending vanes 14, 16, 18 and 20 and having valve plates 22 and 24 detachably and adjustably secured to its opposite sides.

The rotor 12 with its valve plates 22 and 24 are drivingly disposed on a power output shaft 26 that is journaled through the end walls 28 and 30 of a housing designated generally at 32. The housing 32 additionally includes an annular wall 34 engaged between inner and facing peripheral portions of the walls 28 and 30.

The end walls 28 and 30 of the housing 32 are provided with complementary grooves 36 and 38 that are spaced radially inwardly of the wall 34, such grooves being of approximately an elliptical configuration of minor eccentricity such that the minor semiaxis can conveniently be on the order of about 85% the length of the major semiaxis. The grooves 36 and 38 snuggly receive the lateral edges of a resilient circular steel band 40 of cylindrical configuration so as to effect a seal therewith while causing the band 40 to assume an elliptical cross section while retaining its cylindrical configuration.

The housing 32 is retained in assembled relationship by means of circumferentially spaced through bolts 44 that extend through aligned openings 46 that extend through the end walls 28 and 30, the annular wall 34 as well as pairs of seal gaskets 48 and 50 disposed between the latter and the end walls 28 and 30, with the bolts 44 being secured by nuts 52.

The facing sides of the end walls 28 and 30 have cylindrically shaped circular cavities or recesses 54 and 56 that are centered about the axis of the shaft 26.

Figure 4:
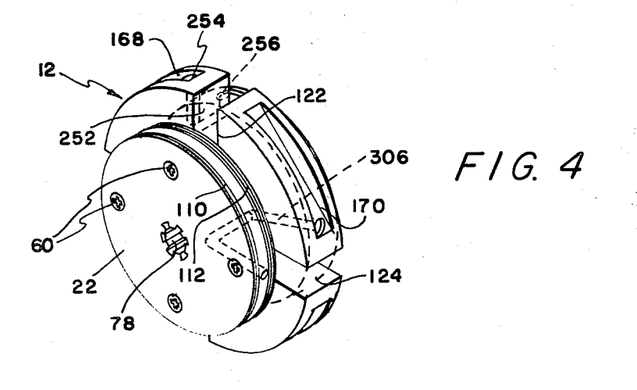
FIG. 4 is an isometric view on a reduced scale of the rotor with valve plates attached, and with certain hidden parts being shown in dashed outline.
Figures 9, 10:
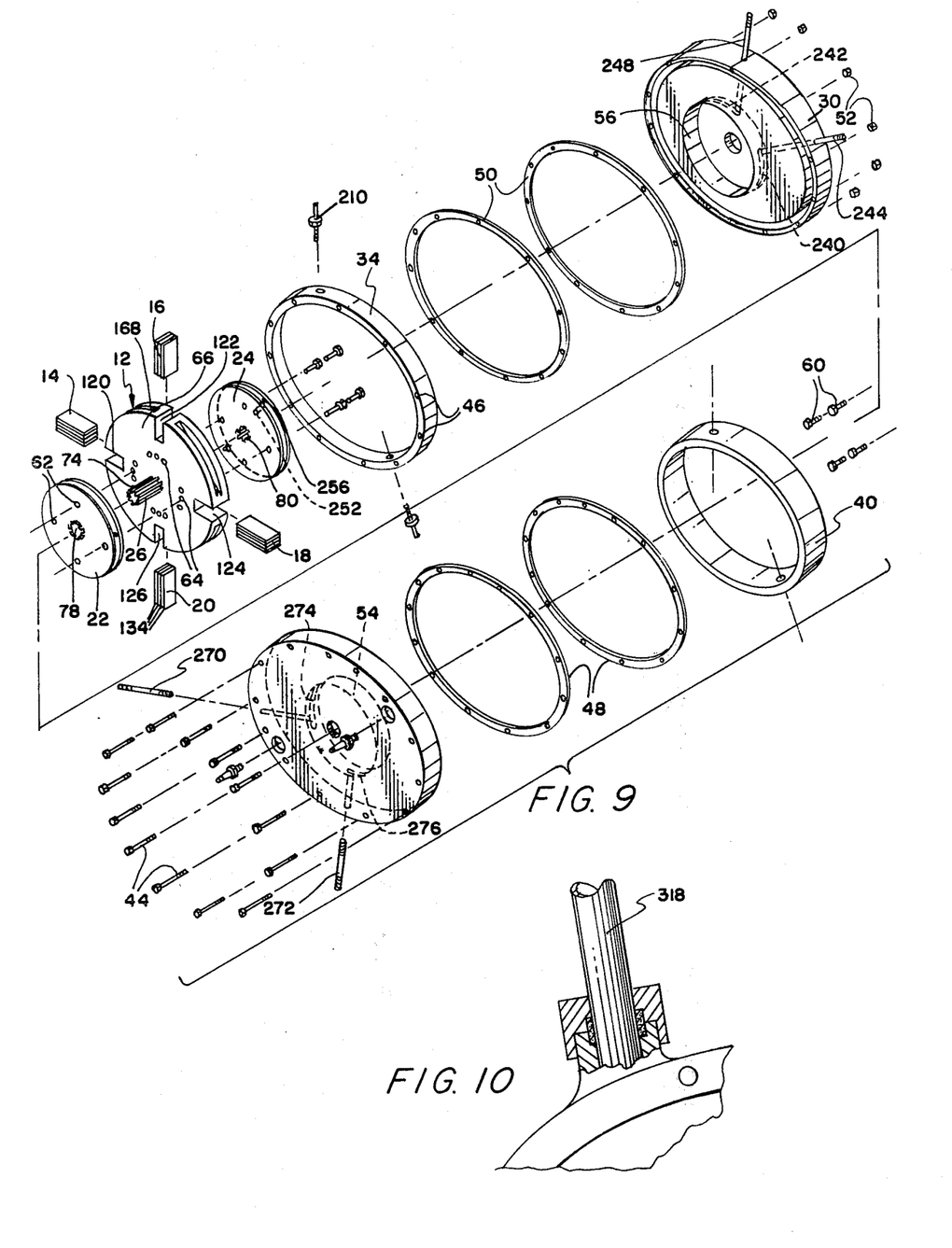
FIG. 9 is an exploded isometric view of the motor illustrative of the spatial and assembly relationships of the parts thereof.
FIG. 10 is an enlarged fragmentary view, partially in section illustrating the manner of connection of supply lines to the motor.

The valve plates 22 and 24 are generally of circular cylindrical configuration and are coaxially secured in a detachable and angularly adjustable manner by identical means which are clearly shown in FIGS. 4 and 9 relative to the valve plate 22, wherein it will be seen that the valve plate 22 is secured by means of screws or threaded fasteners 60 rotatably extending through openings 62 in the valve plate 22 (in which the heads thereof are recessed to be flush with the valve plate 22), such screws 60 being threaded tightly into internally threaded openings 64 in the rotor body or disc 66. It is to be noted that three sets of openings 64 are provided for the screws 60 with such sets being angularly displaced from each other by a small angle for a purpose to be explained presently. Suffice for the moment to observe that the valve plate 22 is normally secured using the angularly centered of the sets of openings 64, but, if desired, can be secured a small angular amount clockwise or anticlockwise from the normally preferred intermediate position for a purpose that will be described in connection with the operation of the motor 10.

The disc 66 has a central opening 70 that slidingly receives the enlarged central portion 72 of the shaft 26, the same being retained thereon by the valve plates 22 and 24, when attached to the disc 66, by reason of the opposite ends of the shaft portion 72 being splined as shown at 74 and 76 with the latter being endwise slidingly received in complementary splined central openings 78 and 80 in the valve plates 22 and 24, respectively. The arrangement is such that the rotor 12 has driving connection to the shaft 26 by way of the valve plates 22 and 24.

The central portion 72 of the shaft 26 with the disc 66 and the valve plates assembled thereon are received within the cavities 54 and 56 and between the adjacent and facing sides 86 and 88 of the end walls 22 and 24, with the relatively reduced opposite end portions 90 and 92 of the shaft 26 being rotatably and sealingly journaled through the centers of the end walls 22 and 24 as indicated at 94 and 96.

Means are provided about the peripheries of each of the valve plates 22 and 24 to prevent fluid flow between the valve plate and its respective end wall at axially spaced positions, while causing a minimum of friction therebetween. As such means are identical with respect to each valve plate, the character of each will be understood on noting that such means provided in connection with the valve plate 22 comprises the portion 100 of the end wall 22 defining the radially outermost part of the cavity 54 is provided with a pair of axially spaced seal rings 102 and 104 that are received in annular grooves 106 and 108 with closely spaced free running clearance. The valve plate 22 is provided with annular grooves 110 and 112 in which the seal rings, which are split and of the same general character as piston rings of convention engine rings 102 and 104 are disposed. The rings 102 and 104 are of sufficient resiliency to be placed in and retained in the grooves 110 and 112 and to enable assembly and disassembly when they are moved into and out of registry with the grooves 106 and 108. As will be evident to those familiar with the sealing ring art, the rings are beveled, not shown, as to not lock to prevent disassembly.

Figures 6, 7:
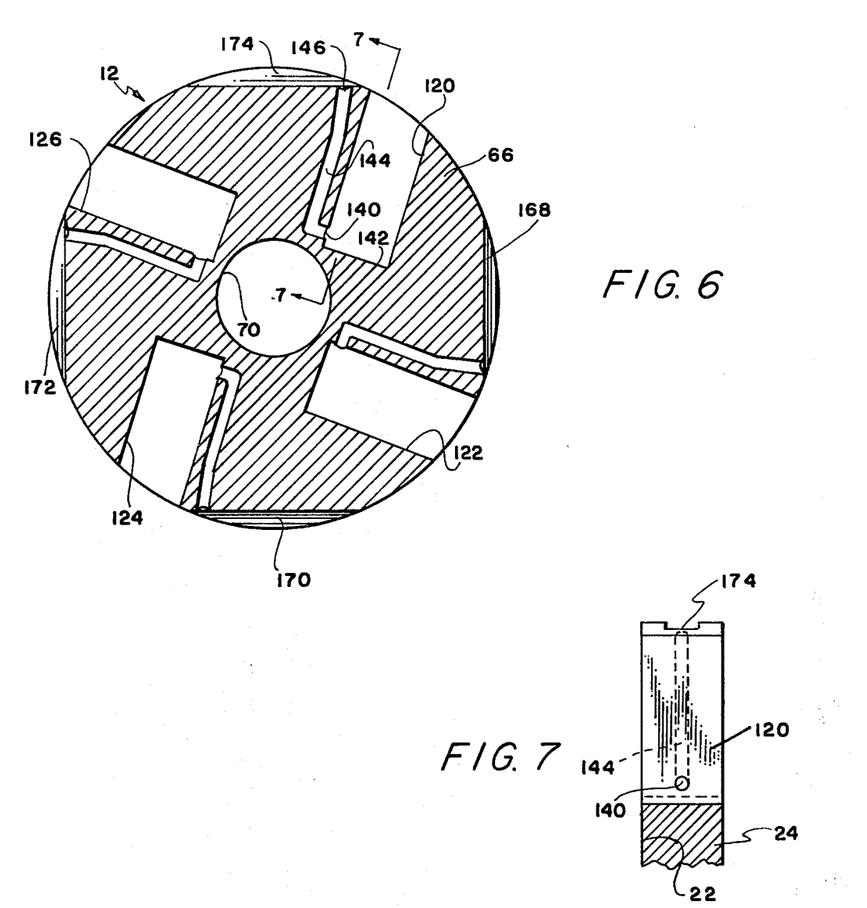
FIG. 6 is a central transverse sectional view of the rotor taken upon the plane of the section line 6—6 in FIG. 8.
FIG. 7 is an enlarged sectional detail view taken upon the plane of the section line 7—7 in FIG. 6.
Figure 8:
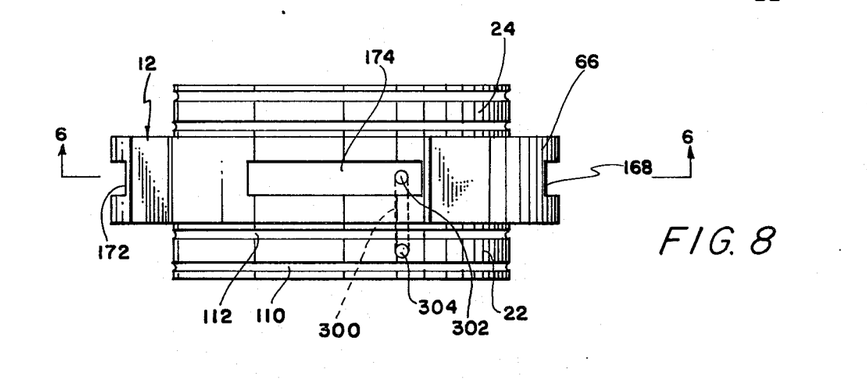
FIG. 8 is a top plan view of the rotor with the valve plates attached.

The rotor body 66 is, as best shown in FIGS. 6 and 9, provided with four generally rectangular recesses 120, 122, 124 and 126 that are displaced 90° from each other. The recesses 120–126 are radially extending to open to the exterior thereof, and are preferably inclined to the radii of the rotor body 66 as shown in FIG. 6. The vanes 14, 16, 18 and 20 are respectively received in the recesses 120, 122, 124 and 126 for sealingly and slidably engaging the band 40 in a manner generally similar to that of my previously identified copending application.

Preferably, each of the vanes 12, 14, 16 and 18 is constituted of a stack of parallel and rectangular plates 134 that are slidable against each other within the stack, and have edges and ends respectively in sliding and sealing engagement with the end wall faces 86 and 88 and the band 40.

The vanes 14, 16, 18 and 20 are centrifugally urged radially outward as well as by fluid pressures existing within the engine 10 as will subsequently be explained. The provision for applying internal fluid pressure to urge the vanes 14, 16, 18 and 20 radially outward is the same for each of the vanes, so an appreciation of such provision for the vane 14 will suffice for all. As noted above, the vane 14 is slidably and sealingly received in the recess 120 so as to be radially extensible therefrom. From a position 140 adjacent the inner end 142 of the recess 120, a passageway 144 communicates with the peripheral exterior of the rotor body 66 at a position 146 axially intermediate the axial extent of the body and angularly spaced from the recess 120 as shown in FIG. 6.

The rotor body 66, the valve plates 22 and 24 together with the vanes 14, 16, 18 and 20 and their seals with the end walls 28 and 30 and the elliptical wall 40 define four chambers 160, 162, 164 and 166 that are separated by the vanes 14, 16, 18 and 20, with such chambers being respectively enlarged by recesses or kerfs 168, 170, 172 and 174 in the periphery of the rotor body 66 intermediate its axial extremities and angularly spaced intermediate the pairs of recesses 120 and 122, 122 and 124, 124 and 126, and 126 and 120.

The aforementioned passageway 144 opens into the chamber 166 via the enlargement constituted of the recess or kerf 174 milled into the rotor body 66 so that the fluid pressure within the chamber 166 is applied against the radially innermost end of the vane 14 to urge radial outward movement of the latter. Similarly, the pressures prevailing in the chambers 160, 162 and 164 are respectively applied against the radially innermost ends of the vanes 16, 18 and 20.

Figure 2:
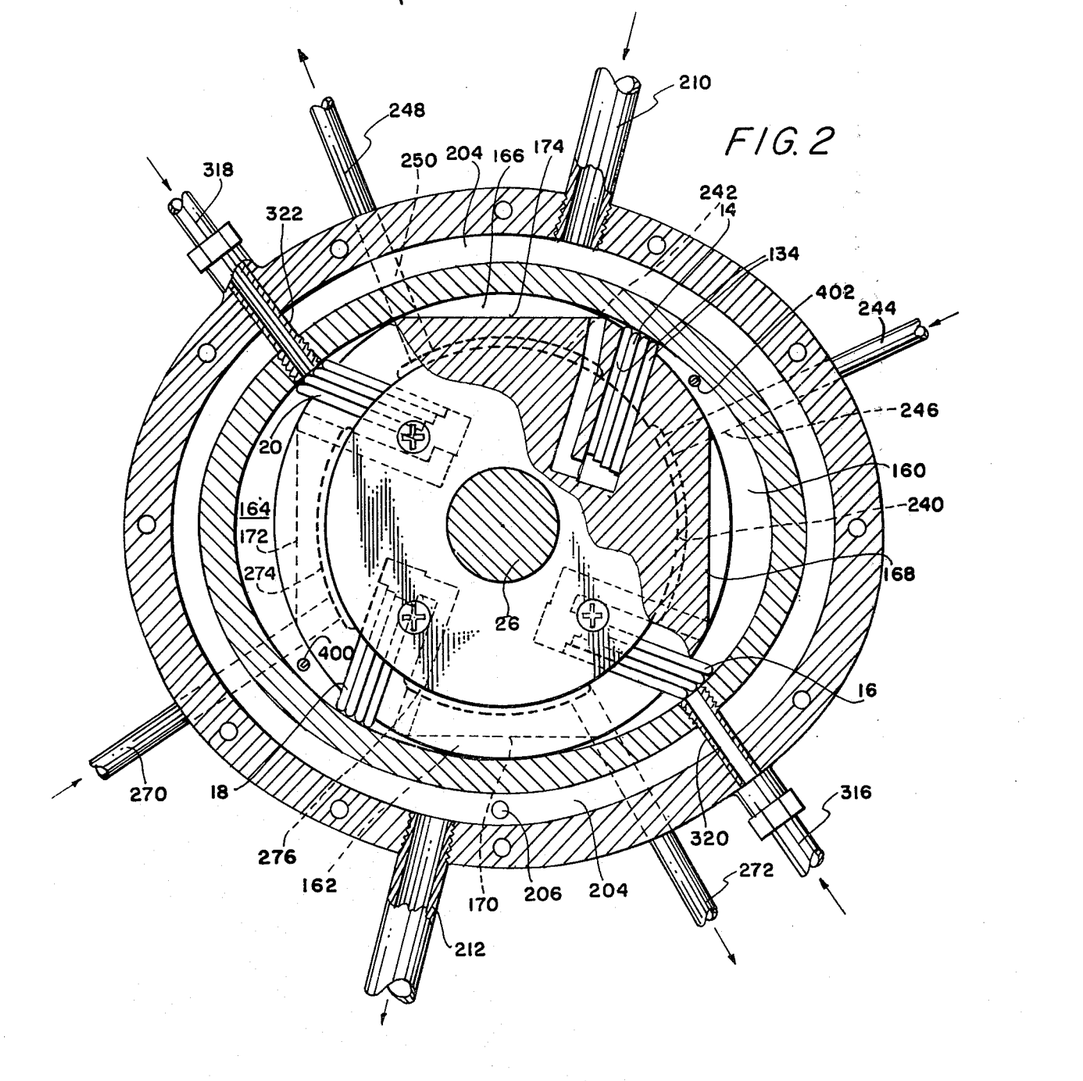
FIG. 2 is an enlarged transverse sectional view of the engine, the view being taken upon the plane of the section line 2—2 in FIG. 1 with hidden details being shown in dashed outline.
Figures 3, 5:
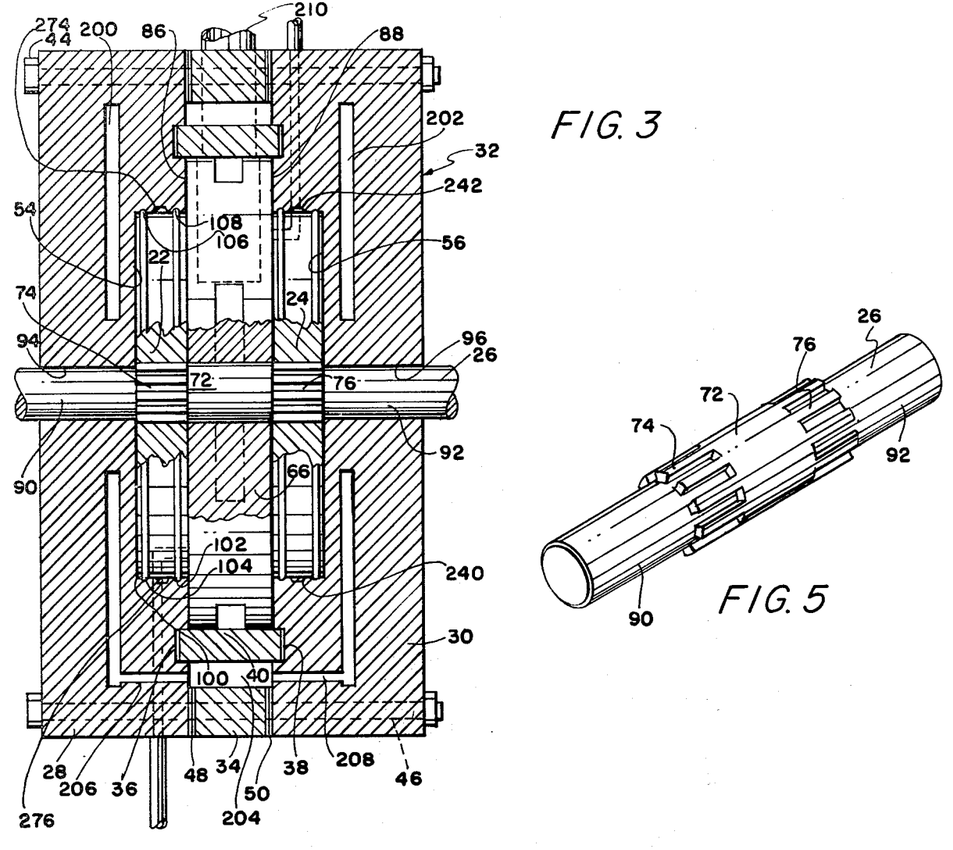
FIG. 3 is a longitudinal sectional view of the engine taken upon the plane of the section line 3—3 in FIG. 2, with all but the central portions of the rotor and valve plates being broken away.
FIG. 5 is an enlarged isometric view of the rotor shaft.

As clearly shown in FIG. 2, the end walls 22 and 24 can be generally elliptical to correspond in shape to the elliptical wall 40, though if deemed necessary or convenient, such may be circular. In any event, the end walls 22 and 24 are provided with internal cavities 200 and 202, each of which communicate at a plurality of circumferentially spaced positions with the annular space 204 between the walls 34 and 40 by way of passageways such as those shown at 206 and 208, as shown in FIG. 3. The cavities 200 and 202, the space 204 and the passageways are for cooling purposes, and inlet and outlet pipes 210 and 212 are threaded into threaded ports in the wall 34 so that a suitable liquid coolant can be circulated into and out of the cavities 200 and 202 and the space 204 whereby the engine 10 can be kept at a suitably low operating temperature, it being understood that the coolant is cooled in any suitable conventional manner prior to being pumped back into the engine 10 via the pipe 210.

Figure 1:
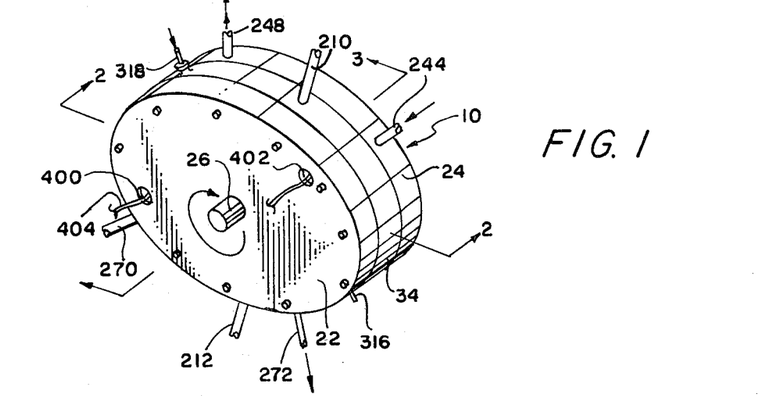
FIG. 1 is an isometric view of the rotary engine.

As thus far described, it will be seen that rotation of the rotor 12 clockwise as shown in FIGS. 1 and 2 is accompanied by the chambers 160, 162, 164 and 166 varying in volume between minimun and maximum values, and when the rotor 12 is positioned as shown in FIG. 2, the diametrically opposed chambers 162 and 166 are at their minimum volumes, while the diametrically opposed chambers 160 and 164 are at their maximum volumes. Clockwise rotation of 90° from the illustrated position will result in the chambers 162 and 166 increasing in volume to their maximum values, while the chambers 160 and 164 diminish from their maximum to their minimum values.

Each of the chambers 160-166 passes through its maximum and minimum volume positions twice during each 360° rotation of the rotor, and with respect solely to volumetric variations, it will be seen that diametrically opposed chambers are in phase with each other, while adjacent chambers 90° are out of phase with each other.

In normal operation of the motor 10, each of the chambers 160-166 is operated in a manner analogous to the operation of a chamber in a 4-stroke cycle piston engine; that is to perform during two complete successive cycles of chamber expansion and contraction the steps of intake, compression, power (combustion and expansion), and exhaust; such four strokes (or phases) requiring two complete revolutions of the crankshaft of a piston engine and one complete revolution of the shaft 26 of the rotary engine 10.

Furthermore, by reason of structure presently to be described, the engine 10 normally operates in such a manner that diametrically opposed chambers are operated 180° out of phase — one intakes while the other effects power expansion, and such one thereafter compresses while such other exhausts — and in such a manner that adjacent chambers are 90° out of phase. In other words, assuming the initiation of a power expansion stroke to initiate relative to chamber 160, 90° of rotation will concur with similar initiation relative to chamber 162, another 90° of rotation will concur with similar initiation relative to chamber 164, with the next two 90° rotations concurring respectively to similar initiations as to chamber 166 and chamber 160, the point of commencement.

Consideration of the foregoing will make it apparent and as will be set forth in detail presently, the power strokes of adjacent chambers are effected at diametrically opposed positions of the housing 32. Indeed each of the four operations performed relative to adjacent chambers are effected at diametrically opposed positions or locations about the housing 32 so that it can be correctly anticipated that mechanical as well as thermal stresses are distributed more uniformly about the housing 32 than is the case with rotary engines wherein all combustion is effected relative to a single continuous angular portion of the housing.

The above described sequencing of operation of the chambers 160, 162, 164 and 166 is obtained by operation of two sets of valve means that are separately associated with the two pairs of diametrically opposed chambers (160 and 164 on one hand, and 162 and 166 on the other hand) to control the valving of inlet air to and exhaust of combustion products from such pairs. The sequencing of operations effected relative to each chamber is also a function of the injection of fuel into the chambers and the subjection of chambers to ignition sparks; however, aside from the provision of two separate fuel injector lines and two separate spark plugs for the two separate pairs of diametrically opposed chambers, the control or timing of the injections of fuel by the injector and of the application of ignition voltages to the spark plugs are in accordance with well and long known practices that are well within the skill of those conversant with the art, and the manner of effecting the particular timing relations will be obvious in the light of the following description of the valving construction.

The diametrically opposed chambers 160 and 164 are controlled as to valving as described above by the valve plate 24, with the diametrically opposed chambers 162 and 166 being controlled by the valve plate 22. As the relationship of the pair of chambers 162 and 166 to the valve plate 22 is identical to the relationship of the chambers 160 and 164 to the valve plate 24, a description of the latter will suffice for both.

As best shown in FIG. 9, the end wall 30 is provided with a pair of arcuate distribution grooves 240 and 242 between the seal rings to afford communication between the cavity 56 and the periphery of the valve plate 24. An air supply pipe 244 is connected to the end wall 30 and supplies air to the groove 240 by way of a passageway 246. The grooves 240 and 242 can each be about 60° in angular extent and the center of the groove 242 is about 90° anticlockwise from the center of the groove 240 as viewed in FIG. 2.

An exhaust pipe 248 is connected to the end wall 30 and has communication with the groove 242 by way of a passageway 250.

A passageway 252 is defined within and jointly by the rotor body 66 and the valve plate 24, such passageway 252 opening into the kerf 168 at 254 and through the periphery of the valve plate 24 at 256. The arrangement is such, bearing in mind the close running clearance between the valve plate 24 and the end wall 30 that the chamber 160 has communication with the air supply pipe 244 when and only when the end 256 of the passageway 252 is in registry with the angular extent of the groove 240. Needless to say, the parts are angularly related so that such registry occurs during one of the angular intervals that the chamber 160 is increasing in volume. Clockwise rotation of the rotor 66 for about 270° from the midpoint communication of the chamber 160 with the groove 240 carries the chamber 160 to about the midpoint of its communication with the exhaust groove or port 242 and the exhaust pipe 248 via the passageway 252.

It will be understood that at a position 180° from the passageway 252 is an identical passageway that communicates between the kerf 172 and its associated chamber 164 and the periphery of the valve plate 24, so that the chamber 164 has the described valved relationship of the chamber 160 to the pipes 244 and 248 except that such valving relationships are 180° out of phase with each other.

An air supply pipe 270 and an exhaust pipe 272 are provided for the chambers 162 and 166 and such pipes respectively communicate with grooves or arcuate ports 274 and 276 associated with the valve plate 22. The chamber 166 is provided with a counterpart of the passageway 252 provided for the chamber 160, such counterpart comprising a passageway 300 defined jointly within the rotor body 66 and the valve plate 22, such passageway 300 opening into the kerf 174 at 302 and to the exterior of the valve plate 22 at 304 between the grooves 110 and 112. 180° from the passageway 300, a similar passageway 306 communicates between the kerf 170 and the exterior of the valve plate 22 as shown in FIG. 4.

At diametrically opposed positions a pair of fuel injection supply lines 316 and 318 are connected to the housing 32 and such respectively communicate through the walls 34 and 40 to the interior of the latter by tubings 320 and 322 thread fitted to the wall 40 through aligned openings in the wall 34. As explained in greater detail subsequently, fuel is normally pulsed every 180° of shaft 26 rotation to the chambers 160 and 164 preferably shortly after such chambers have commenced to diminish in volume in effecting the compression stroke. Fuel is pulsed through the pipe 318 to the chambers 162 and 166 every 180° of shaft 26 rotation at preferably the commencement of compression of air previously drawn (or forced into if the air lines 244 and 270 are supercharged) into such chambers.

Disposed within the end wall 22 and having their electrodes exposed to the orbiting chambers 160-166 but out of the path of the vane means 14-20 are a pair of spark plugs 400 and 402 that are respectively supplied by high tension lines 404 and 406. The plugs are displaced 180° from each other and like the fuel lines 316 and 318 are alternately pulsed every 180° of rotation with the plugs being pulsed 90° out of phase with each other so as to initiate combustion and power strokes of the chambers 160 and 164 on one hand and 162 and 166 on the other hand as such chambers are at positions approximating maximum compression. In other words, first one and then the other of the plugs is pulsed every 90° of shaft 26 rotation. The spark plug 400 serves to initiate ignition in the chambers 160 and 164, while the plug 402 serves to initiate combustion in the chambers 162 and 166, as will be evident.

The synchronization of ignition pulses and indeed minor variations in the phasing of such pulses with maximum compression positions (spark advance and retardation) are old and well known arts and the provision of such a system (as in the case of the injection fuel system) and operative coupling of the same to the shaft 26 to produce the desired operation is plainly within the skill of the art and a detailed disclosure would serve to obfuscate the actual invention while not serving any useful purpose.

While the fuel injection and ignition systems are in themselves conventional, the previously described valving system constitutes a departure from prior proposals, especially as to the mode of rotary engine operation thereby achieved.

In normal operation the upper righthand portion of the housing 32 as viewed in FIG. 2 alternately bounds expanding chambers that are effecting an intake stroke and a power stroke, and the same is also true of the lower lefthand portion. The lower righthand portion alternately bounds contracting chambers with respect to which compression and exhaust strokes are being effected, and the same is true of the upper left portion of the housing 32.

Such alternate functions performed by different portions of the housing plainly reduces the mechanical and thermal stress that must be endured by distributing the same and further tends to provide a smoother and more balanced engine of lighter weight and of more reliable and durable operation.

The vanes 14-20 are centrifugal and fluid pressure urged to effect a good seal with the wall 40, and it will be noted that such blow by of unburned fuel air mixture as may occur will at least in part pass into a lending chamber with respect to which ignition is yet to be effected, whereby fuel is saved and pollution minimized. In addition, the pressure volume energy of such blow by would be conserved for shaft output on the next power stroke of the leading chamber.

The described engine 10 affords means for advancing and retarding the valving action in relation to the expansion-contraction cycles of the chambers by reason of the angular adjustability in the mounting of the valve plates 22 and 24 on the rotor body 66.

The engine 10 is especially well suited to modification of the pulsing of the fuel injection system to effect a reduction in firing rate relative to the engine speed. For example, the operative connection of the shaft 26 to the ignition can be geared down (not shown) to effect an injection through the pipe 316 every 540°, rather than every 180°, with the pulses to the pipes 316 and 318 being 270° apart rather than 90°. Such would serve to result in a total of 11/3 rather than 4 power strokes per turn of the shaft 26. Even more drastic reduction in power consumption can be obtained on injecting fuel through the pipe 316 every 900° (placing line 318 450° out of phase), so that 4/5 power impulses are obtained per revolution. In many respects such reduction in relative rates of fuel injection for firing impulses would serve the same purpose of the gear ratio in a conventional transmission.

The engine affords yet other advantages in that the arrangement of the fluid pressure communication between the chamber within which a power stroke is being effected (combustion within such chamber accompanied by chamber expansion to produce useful mechanical work output) and the inner end of vane means bounding such chamber so as to urge and cause the latter to move radially outward as a piston for sealing purposes, also is thought to contribute to the amount of volumetric variation of the chamber during rotation of the rotor. In other words, it is believed that desired mechanical output is derived from the fluid pressure in the chamber in its power stroke phase acting against and displacing the vane means radially outward.

It is thought probable that the work output effect mentioned in the preceding paragraph may be augmented by the canting or tilting of the vanes in that the latter are inclined to the radius from the center of the rotor so that a reactive force or kick may be obtained between the vane and the housing tending to urge rotation of the rotor. In any event, the canting of the vane means increases the magnitude of vane movement displacement that would otherwise occur.

To avoid any possible confusion, it should be noted that whereas the word "stroke" has been used, the same may be construed wherever desired as the word "phase" as it may be more appropriate to rotary rather than reciprocating engines.

Attention is now directed to the appended claims for an appreciation of the scope of the invention.

I claim:

1. In a method of operating a rotary engine of the type wherein an even number of circumferentially spaced operating zones are caused to orbit an axis and sequentially pass through an even number of fixed sectors with each zone alternatively increasing and decreasing in volume as it passes through successive sectors, and wherein a four-phase operating cycle of essentially four 90° degree phases is effected relative to each of the zones, the improvement comprising operating pairs of zones, that are spaced apart by a single intervening zone, out of phase with each other 180 plus 360 times N degrees, the operating pairs of zones, that are immediately adjacent to each other, out of phase with each other 90 plus 180 times N degrees, with N having a value selected the positive integers.

2. In a rotary internal combustion engine of the type wherein four circumferentially spaced variable volume operating zones orbit an axis, and wherein each zone is operated during successive 90° portions of its orbit to sequentially intake air, to compress such air, to combust fuel with such air while expanding in volume in the doing of mechanical work, and to exhaust the products of combustion, the improvement comprising means for synchronizing the operation of each of the zones to be respectively 90° ahead of and 90° behind the operation of the zones immediately leading and trailing the same in orbit.

3. An improved method of operating a rotary internal combustion engine of the type wherein a stationary and non-circular housing has a rotor therein having circumferentially spaced and radially extensible sealing means rotatable therewith engaging the housing to define a plurality of circumferentially spaced and rotating chambers that are sealed from each other in an arrangement such that each chamber alternately expands and contracts twice during each rotation of the rotor, and such that circumferentially contiguous first and second portions of the housing are respectively associated with the volumetric expansion and contraction of chambers moving thereby during their rotation, comprising the alternate introduction of air into and effecting combustion in chambers successively moving by the first portion of the housing, and the alternate compression and exhaustion of the contents of chambers successively moving by the second portion of the housing.

4. The method of claim 3, wherein a first chamber is placed in fluid communication with a source of air while moving by the first portion of the housing and is thereafter closed against external fluid communication while thereafter moving by the second portion of the housing, and wherein a second chamber immediately adjacent the first chamber is closed against external fluid communication as combustion is conducted therein while moving by the first portion of the housing, and thereafter opening the second chamber for external fluid communication to exhaust combustion products therefrom while the second chamber is moving by the second portion of the housing.

5. The combination of claim 4, wherein the opening and closing of the chambers is effected in response to the angular position of the rotor in the housing.

6. In a method of operating a rotary internal combustion engine of the type wherein four circumferentially spaced zones rotate to orbit about an axis to sequentially pass through four fixed quadrants with the volume of each zone alternately increasing and decreasing as it passes through the first, second, third and fourth of such quadrants, and wherein a four-phase operating cycle is effected relative to each of said zones, with diametrically opposed zones being operated 180 plus 360 times N degrees out of phase with each other, and with adjacent zones being operated 90 plus 180 times N degrees out of phase with each other, with N having a value selected from the values of zero and the positive integers.

7. The method of claim 6, wherein the value of N is zero, whereby a power output can be obtained on each 90° rotation with combustion being effected alternately with respect to zones passing the first and third quadrants.

8. The method of claim 6, wherein the value of N is unity, whereby a power output can be obtained on each 270° rotation with combustion being effected alternately with respect to zones passing the first and third quadrants.

9. In a rotary internal combustion engine of the type wherein a rotor is mounted for rotation in a housing having an elliptical inner wall surface with the rotor having four circumferentially spaced vane means rotatable therewith that slidingly and sealingly engage the wall surface to define and separate four chambers that are circumferentially spaced about the rotor that vary in volume during rotation of the rotor, the improvement comprising the housing having a pair of air inlet ports opening to a surface of revolution of the rotor, said housing having a pair of exhaust ports opening to the surface of revolution of the rotor, valve means for admitting air into and exhausting combustion products from each of said chambers during rotor rotation, said four chambers being arranged as two pairs of diametrically opposed chambers, said valve means comprising two isolated passageway means in said rotor that open to one pair of the chambers and that open to the surface of revolution and which are in fluid communication registry with one of the inlet ports and one of the exhaust ports during predetermined portions of angular movement of the rotor to effect valving action, said valve means additionally comprising said rotor having two other isolated passageway means that open to the other pair of chambers and that open to the surface of revolution and which are in fluid communication registry with the other inlet port and the other exhaust port during predetermined portions of angular movement of the rotor to effect valving action, the arrangement being such that the members of each of the diametrically opposed pairs of chambers have inlet and exhaust fluid communication at angular positions each of which is 180° from the other, and such that the chambers which are adjacent to each other have inlet fluid communication at angular positions spaced 90° from each other.

10. The combination of claim 9, including means for angularly displacing said passageway means relative to the vane means.

11. The combination of claim 9, wherein the surface of revolution includes two portions axially spaced from each other and axially on opposite sides of the vane means, one of said inlet ports opening to one of said surface portions and the other of said inlet ports opening to the other of said surface portions, and the other of said exhaust ports opening to the other of said surface portions.

12. The combination of claim 9, wherein each of the valve means comprises the rotor having a recess with an inner extent and opening through the exterior of the rotor, and a vane slidably and sealingly received in the recess, each of said chambers being associated with one of the vane means bounding the same by said rotor having a passageway therein affording fluid communication between said chamber and the inner extent of the recess whereby fluid pressure in such chamber is applied against the vane to urge the latter outward as a piston.

13. The combination of claim 12, wherein said recess and the direction of movement of the vane therein is inclined to the radius of the rotor.

14. The combination of claim 12, wherein each chamber, during engine operation, immediately trails the recess with respect to which its pressure is applied.

15. The combination of claim 14, wherein said recess and the direction of movement of the vane therein is inclined to the radius of the rotor.

16. The combination of claim 15, wherein the vane is canted in a direction such that the radially outermost portion of the vane angularly trails the radially innermost end during engine operation.

* * * * *